US006414989B1

(12) United States Patent
Olafsson et al.

(10) Patent No.: US 6,414,989 B1
(45) Date of Patent: Jul. 2, 2002

(54) UPSTREAM PCM TRANSMISSION FOR A MODEM SYSTEM

(75) Inventors: Sverrir Olafsson; Olafur Jonsson, both of Reykjavik (IS)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/395,726

(22) Filed: Sep. 10, 1999

(51) Int. Cl.[7] .............................. H03H 7/30; H03H 7/40; H03K 5/159
(52) U.S. Cl. ........................................ 375/229; 375/222
(58) Field of Search ................................ 375/219, 220, 375/221, 222, 229, 232, 233, 242, 254, 256, 259, 285, 296, 224, 346, 350; 708/300, 322, 323

(56) References Cited

U.S. PATENT DOCUMENTS

| 5,105,443 A | * | 4/1992 | Betts et al. |
| 5,291,521 A | * | 3/1994 | Betts et al. |
| 5,887,027 A | | 3/1999 | Cohen et al. |

FOREIGN PATENT DOCUMENTS

| EP | 0634856 | 1/1995 |
| EP | 0669740 | 8/1995 |
| EP | 0876030 | 11/1999 |
| EP | 1049300 | 11/2000 |
| WO | WO 98/32257 | 7/1998 |
| WO | WO 98/13977 | 4/1999 |
| WO | WO 99/34504 | 7/1999 |
| WO | WO 99/34565 | 7/1999 |
| WO | WO 99/34566 | 7/1999 |
| WO | WO 99/38299 | 7/1999 |

OTHER PUBLICATIONS

"Recommendation V.90", ITU–T Telecommunication Standardization Sector of ITU, Sep. 1998, pp. 7, 9–10.
Warke, N. et al., "On the Next Generation of High–speed Voiceband Modems", 1999 IEEE International Conference on Communications, vol. 1, Jun. 6–10, 1999, pp. 256–260.
International Search Report, Dec. 11, 2000.

* cited by examiner

Primary Examiner—Jean Corrielus
(74) Attorney, Agent, or Firm—Farjami & Farjami LLP

(57) ABSTRACT

A modem system utilizes PCM encoding and transmission techniques in the upstream direction from a client modem (connected to a digital network via an analog loop) to a central site modem (connected to the digital network via a digital link). The modem system employs precoding techniques that enable the transmit signal to be pre-equalized to compensate for the analog channel characteristics. The precoding technique generates a plurality of equivalent signal point sequences in response to a digital data input. The signal point sequences are analyzed and compared relative to a predetermined cost metric such as transmit power. A preferred signal point sequence is selected and transmitted to the central site modem.

38 Claims, 5 Drawing Sheets

UPSTREAM PCM TRANSMISSION FOR A MODEM SYSTEM

FIELD OF THE INVENTION

The present invention relates generally to a pulse code modulation modem system. More particularly, the present invention relates to an upstream transmission scheme for transmitting data from a client modem coupled to a digital telephone network via an analog connection to a central site modem coupled to the digital telephone network via a digital connection.

BACKGROUND OF THE INVENTION

FIG. 1 is a block diagram representation of a prior art V.90 modem system 100. V.90 modem systems (i.e., systems compliant with the ITU-T Recommendation V.90) utilize pulse code modulation (PCM) techniques in the downstream direction and conventional V.34 voice band techniques in the upstream direction. As used herein, the downstream direction refers to transmissions from a digital PCM modem (DPCM) 102 to an analog PCM modem (APCM) 104, while the upstream direction refers to transmissions from APCM 104 to DPCM 102. In the context of a common practical application, APCM 104 may be considered to be a client modem and DPCM 102 may be considered to be a server modem or a central site modem.

APCM 104 is coupled to a digital communication network, e.g., the public switched telephone network (PSTN) 106 via an analog connection 108, e.g., the local loop associated with a user's telephone line. Analog connection 108 may be connected to a central office 110, which in turn is coupled to PSTN 106 via a digital connection 112. DPCM 102 is coupled to PSTN 106 via a digital connection 114. Modem system 100 takes advantage of the digital nature of PSTN 106 to enable downstream transmission at a theoretical data rate of 56 kbps.

Upstream transmissions in modem system 100 are limited by the quantization noise introduced by the codec resident at central office 110. The central office codec filters incoming signals before an analog-to-digital conversion. The filters at the codec remove low frequency components below approximately 100 Hz (the −3 dB cutoff frequency) and high frequency components above approximately 3.5 kHz. Without taking advantage of the details of the central office codec, the upstream channel can be modeled as a channel having a signal-to-noise ratio (SNR) of about 37 dB. Thus, even if an upstream signal is adequately equalized by DPCM 102, the overall performance will be limited by the 37 dB SNR. Consequently, V.34 modems (and upstream V.90 transmissions) are currently limited to a maximum theoretical data rate of 33.6 kbps.

In a V.34 system, a form of Tomlinson-Harashima precoding is employed to pre-equalize the transmit signal in a manner that compensates for the channel characteristics. The transmit modem includes an equalizer structure that is tuned after a training procedure during which the receive modem trains an equivalent equalizer structure in response to a known training sequence. The receive modem communicates the equalizer filter tap settings back to the transmit modem for use in the precoding scheme. However, merely shifting the equalization function to the transmit modem may result in a dramatic increase in transmit power. Accordingly, precoding is applied such that the transmit power penalty is decreased. Tomlinson-Harashima (and other) precoding techniques are generally known to those skilled in the art. For example, such precoding techniques are set forth in detail in Lee & Messerschmitt, DIGITAL COMMUNICATION (Kluwer Academic Publishers, 2d ed., 1994), the content of which is hereby incorporated by reference.

PCM modulation for the upstream channel has been proposed in an effort to increase the upstream data rate in V.90 modem systems. In other words, the PCM scheme utilized for the downstream channel (or a modified version thereof) may be utilized for upstream data communication. Using upstream PCM modulation, theoretical data rates up to 48 kbps can be achieved if suitable equalization and processing are performed by modem system 100.

The Tomlinson-Harashima and V.34 preceding techniques are not effective in the context of a data communication system that employs a PCM modulation scheme. These prior art precoding techniques are based on the fundamental assumption that the transmit signal points are spaced apart in a linear or uniform manner. In other words, any two "neighboring" signal points in a V.34 modem system are separated by the same distance. In contrast, mu-law and A-law signal point constellations (either of which may be used in a practical PCM modem system) and constellations derived from mu-law or A-law constellations include signal points that are nonlinearly spaced. For example, signal points associated with relatively lower transmit power are spaced closer together than signal points associated with relatively higher transmit power.

Due to the inapplicability of V.34 preceding for PCM signal point sequences, a need exists for an appropriate technique that is compatible with upstream PCM transmissions.

BRIEF SUMMARY OF THE INVENTION

A data communication system in accordance with the present invention provides an improved technique for providing PCM transmissions in the upstream direction from a client device to a server or central site device. The techniques of the present invention may be applied in the context of a modified V.90 modem system that utilizes PCM encoding in the upstream direction. The client modem device utilizes pre-equalization to compensate for characteristics of the upstream channel and a preceding technique to achieve upstream data rates that can exceed the maximum theoretical upstream data rate associated with conventional V.90 modem systems. The precoding technique does not rely on known Tomlinson-Harashima or V.34 precoding schemes.

The above and other aspects of the present invention may be carried out in one form by a modem device for transmitting data to a remote device over an upstream channel. One such modem device includes a data mode mapper configured to map digital data into a plurality of equivalent signal point sequences, where each signal point is selected from a nonlinearly-spaced signal point constellation. The modem device also includes a cost metric analyzer configured to obtain a measurable quantity for each of the equivalent signal point sequences and a selection element configured to select a preferred signal point sequence based on a comparison of the measurable quantity for a number of equivalent signal point sequences.

BRIEF DESCRIPTION OF THE DRAWINGS

A more complete understanding of the present invention may be derived by referring to the detailed description and claims when considered in connection with the following illustrative Figures, wherein like reference numbers refer to similar elements throughout the Figures and:

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely one illustrative application for the invention. Further, it should be noted that the present invention may employ any number of conventional techniques for data transmission, signaling, data processing, network control, and the like. Such general techniques that may be known to those skilled in the art are not described in detail herein.

It should be appreciated that the particular implementations shown and described herein are illustrative of the invention and its best mode and are not intended to otherwise limit the scope of the present invention in any way. Indeed, for the sake of brevity, conventional signal processing, data transmission, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 2:
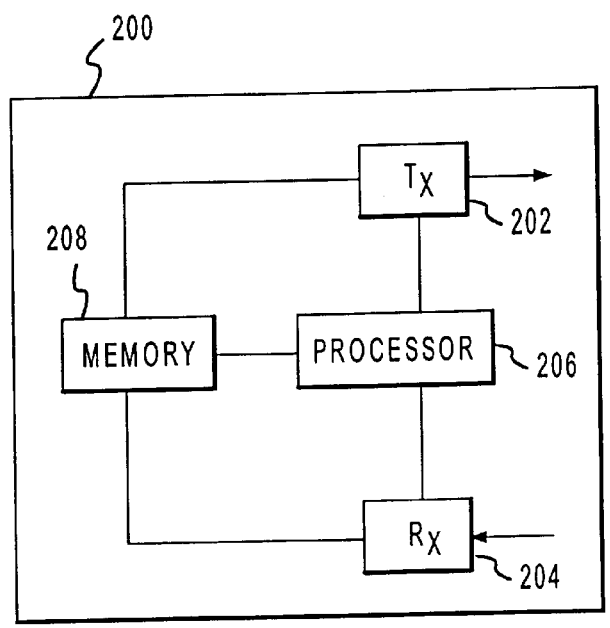
FIG. 2 is a block diagram representation of a general modem device.

FIG. 2 is a block diagram depicting a general modem device 200 that may be utilized in the context of the present invention. For purposes of this general description, modem device 200 may represent an APCM, a DPCM, a server modem, a client modem, or any device that is configured to function in the manner set forth herein. Modem device 200 is preferably configured to carry out a number of conventional data communication processes along with the various processes described herein.

Modem device 200 may be configured such that it can function in both a transmit mode and a receive mode. Modem device 200 is generally configured in accordance with known principles to communicate over a digital communication network, such as PSTN 106, via at least one communication channel. For the sake of clarity, FIG. 2 does not show the various encoder, decoder, and other detailed functional elements that would typically be present in a practical modem system.

Modem device 200 generally includes a transmitter 202, a receiver 204, a processor element 206, and a memory element 208. In addition to the specific operations described herein, processor element 206 is suitably configured to carry out various tasks associated with the operation of modem device 200 and various tasks associated with the system in which modem device 200 operates. Indeed, modem device 200 may incorporate any number of processors and/or control elements as necessary to support its functionality. Such processor and control elements may suitably interact with other functional components of modem device 200 (or the associated modem system) to thereby access and manipulate data or monitor and regulate the operation of the modem system.

As depicted in FIG. 2, processor element 206 may be operationally associated with transmitter 202, receiver 204, and memory element 208. Processor element 206 may be realized by a suitable digital signal processing component that is configured to operate in conjunction with transmitter 202, receiver 204, memory element 208, and/or suitable software instructions to carry out the various processing tasks described herein.

Transmitter 202 is configured to transmit encoded symbols in accordance with conventional data transmission techniques. Such symbols may represent data, training sequences, synchronization signals, control signals, information exchange sequences, or any suitable communication signal utilized by the modem system. Receiver 204 may also be configured in accordance with any number of known modem technologies. Receiver 204 is configured to receive communication signals from a remote modem device; such signals may include encoded information bits, control signals, information exchange sequences, training sequences, and the like. Modem device 200 is preferably configured to generate, transmit, receive, and process different data and signals associated with the operation of the modem system. Such data, signals, and sequences may be suitably stored, formatted, and produced by any number of microprocessor-controlled components.

Modem device 200 also includes a suitable amount of memory 208 necessary to support its operation. Memory element 208 may be a random access memory, a read only memory, or a combination thereof. Memory element 208 may be configured to store information utilized by the modem system in connection with one or more processes related to the present invention, as described in more detail below. Modem device 200 may employ any number of conventional memory elements; the fundamental operation of such memory elements, which are generally well known in the art, will not be described in detail herein.

Figure 1:
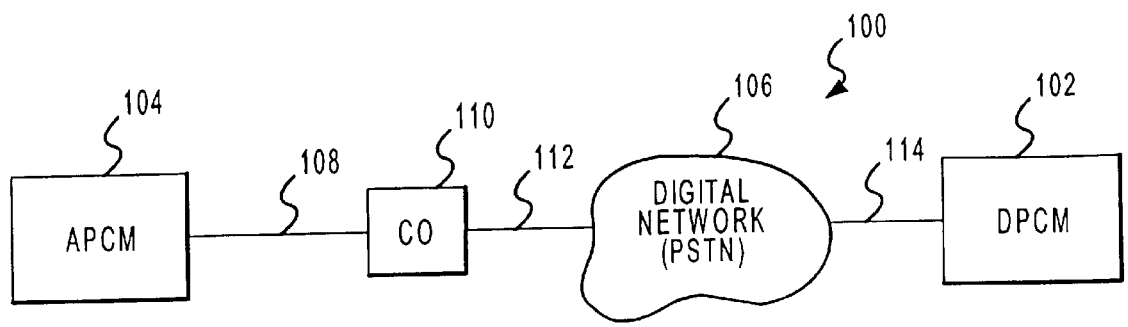
FIG. 1 is a block diagram representation of a prior art V.90 modem system.

In addition to the elements shown in FIG. 2, APCM 104 may also include a suitable hybrid component (not shown) that serves as an interface to analog connection 108 (see FIG. 1). In contrast, DPCM 102 does not require a hybrid because it is coupled to PSTN 106 via digital connection 114.

The general system arrangement depicted in FIG. 1 may also correspond to a modem system configured in accordance with quadrature amplitude modulation (QAM) transmission techniques or pulse amplitude modulation (PAM) techniques such as PCM. Although the present invention may be implemented in any number of practical applications (including legacy modem systems having both modem devices connected to an analog line), the following description relates to a PCM modem system. Unlike conventional V.90 modem systems that utilize a conventional V.34 scheme to transmit data from APCM 104 to DPCM 102, a modem system according to the present invention also utilizes PCM encoding in the upstream direction. The use of PCM encoding by APCM 104 enables the modem system to transmit upstream data at a rate higher than that typically achieved by conventional V.90 and V.34 systems. The techniques of the present invention may be utilized to achieve upstream data rates (using PCM encoding) of up to 48 kbps. The present invention employs a precoding scheme to equalize the upstream signal prior to transmission to address the SNR limitations imposed by the central office codec filters.

Figure 3:
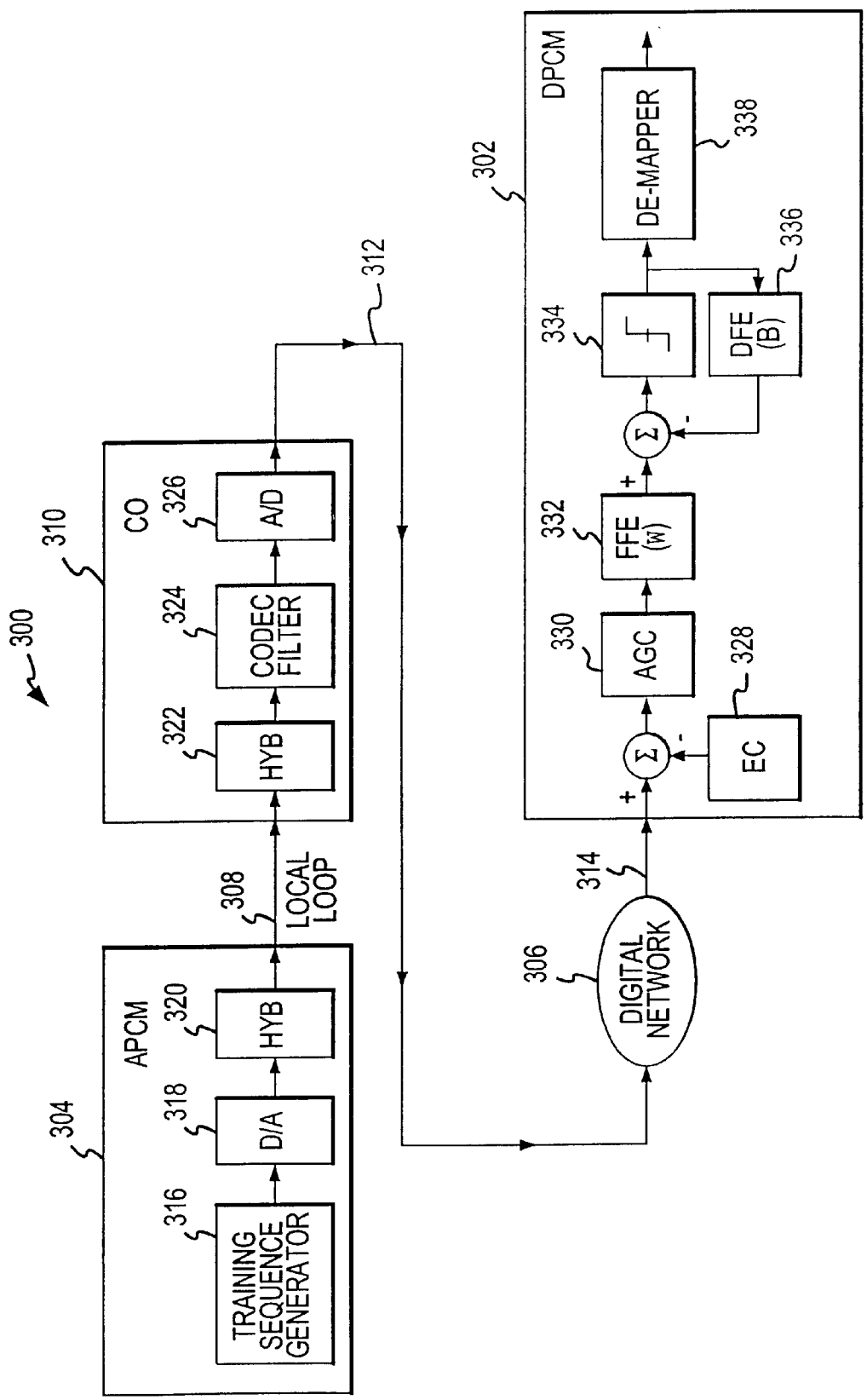
FIG. 3 is a block diagram representation of a modem system operating in a training mode.

FIG. 3 is a block diagram representation of a modem system 300 operating in an upstream training mode. The training mode preferably occurs during the initialization of modem system 300; the training procedure is performed to enable modem system 300 to determine and compensate for the imperfect characteristics of the upstream communication channel. The present invention may utilize any number of conventional or proprietary training techniques to determine the analog characteristics of the upstream channel. Once the characteristics of the upstream channel are learned, modem system 300 can perform equalization to compensate for the upstream channel characteristics.

As in FIG. 1, modem system 300 may include (or operate with) an APCM 304, an analog local loop 308, a central office 310, a digital connection 312 associated with central office 310, a digital communication network 306, a DPCM 302, and a digital connection 314 associated with DPCM 302. As mentioned above, a practical modem system may be physically implemented in any number of ways and may include a number of additional or alternative functional "blocks" associated with APCM 304, central office 310, DPCM 302, and/or other components of the system.

APCM 304 generally includes a training sequence generator 316, a digital-to-analog (D/A) converter 318, and a hybrid element 320. During the training mode, training sequence generator 316 produces a suitable training signal for transmission from APCM 304 to DPCM 302. For example, the training signal may be a sequence of positive and negative values of one PCM signal point or codeword. The particular codeword utilized in the two-point training sequence may be predetermined or adaptively determined by modem system 300 prior to commencing the two-point training procedure. The upstream training sequence may utilize mu-law signal points, A-law signal points, universal codes that represent mu-law or A-law signal points, or any number of signal points associated with a non-linearly spaced signal point constellation. In the context of a modified V.90 system, the training sequence may be formatted in accordance with the conventional two-point sequence set forth in the V.90 Recommendation. The details of the V.90 training phases and other aspects of a V.90 modem system may be found in ITU-T Recommendation V.90 (International Telecommunication Union, September 1998), the content of which is incorporated by reference herein.

In accordance with one practical embodiment, the training sequence is formatted such that it contains more spectral energy at lower frequencies and less spectral energy at higher frequencies. In other words, the training sequence preferably has a colored spectrum that favors lower frequencies. In contrast, during the data mode, the transmitted signals are formatted such that the spectral content is relatively even throughout a given frequency range. Thus, although the training sequence is relatively colored, the data sequence is relatively white. This training scheme differs from the conventional V.90 technique, which requires a white training sequence and colored data sequences (having little or no low frequency content).

D/A converter 318 is configured to convert the PCM training sequence into a plurality of analog levels suitable for transmission over local loop 308 to central office 310. In a practical embodiment, D/A converter 318 receives a current digital codeword and generates a level corresponding to a mu-law or A-law analog level. Hybrid 320 functions as an interface to local loop 308 and to enable APCM 304 to function in a full-duplex manner. The prior art is replete with D/A converters and hybrids that may be suitable for use in connection with modem system 300. Accordingly, the design and operation of D/A converter 318 and hybrid 320 will not be described in detail herein.

Central office 310 generally includes a hybrid element 322, an upstream codec filter element 324, and an analog-to-digital (A/D) converter 326. Hybrid element 322, like hybrid element 320, acts as an interface between local loop 308 and central office 310. Codec filter element 324 may be realized by any number of filters that combine to exhibit a particular frequency response. In practical PSTN environments, upstream codec filter element 324 has a relatively flat frequency response between about 100 Hz and about 3.5 kHz (these frequencies are typically considered to be the −3 dB cutoff frequencies). The frequency response of upstream codec filter element 324 drops sharply from 100 Hz to DC (to remove 60 Hz and other low frequency components) and tapers in a more gradual manner from 3.5 kHz to above 4.0 kHz. In the context of a V.34 modem system, where the transmit bandwidth is 200 Hz to 3.6 kHz, codec filter element 324 does not severely impair the transmit signal because the codec filter response is relatively flat throughout the transmit bandwidth. In contrast, in the context of PCM transmissions that take advantage of the 8 kHz sample rate, the entire bandwidth from DC to 4.0 kHz may be utilized. Consequently, upstream PCM transmissions can be adversely affected by codec filter element 324. As described in more detail herein, the present invention employs a precoding scheme to address the nonuniform frequency response of codec filter element 324.

A/D converter 326 receives the filtered analog levels corresponding to the training sequence and converts the analog signal into a sequence of codewords (e.g., 8-bit mu-law or A-law codewords) for transmission over digital network 306. In a practical system, quantization error is introduced by A/D converter 326 because each analog input level is converted into one of 256 codewords. As mentioned above, the quantization by A/D converter 326 introduces a noise floor of about 37 dB. In practice, A/D converter 326 may be combined with codec filter element 324 and implemented as a single codec circuit. After the A/D conversion, the training signal is transmitted through digital connection 312, digital network 306, and digital connection 314 as a stream of encoded digital data (8,000 samples per second; eight bits per sample).

The encoded training sequence is eventually received by DPCM 302. Thus, the information received by DPCM 302 is a filtered and sampled version of the analog training signal generated by APCM 304. During the training procedure, DPCM 302 analyzes the received signal to estimate the characteristics of the upstream channel. As shown in FIG. 3, DPCM 302 may utilize an echo canceler 328, an automatic gain control (AGC) element 330, a feedforward equalizer (FFE) 332, a slicer 334, a decision feedback equalizer (DFE) 336, and a de-mapper 338. For the sake of brevity, the description of DPCM 302 relates to its operation in the training mode.

Echo canceler 328, which may be configured in accordance with any number of conventional techniques, compensates for unwanted echo signals associated with signals originating from DPCM 302. AGC element 330 may also utilize known techniques to enable DPCM 302 to adjust the magnitude of the incoming sequence in a suitable manner. In the preferred embodiment, the settings for AGC element 330 are adaptively determined in response to the training sequence such that a substantially constant output power is provided independent of the channel attenuation; the settings may be stored and subsequently communicated to APCM 304 (described in more detail below).

FFE 332 and DFE 336 may be associated with a receiver equalizer structure for DPCM 302. In a practical implementation, FFE 332 and DFE 336 are adaptive equalizer structures having adjustable parameters, e.g., filter taps, that control the characteristic filtering response of the equalizers. In FIG. 3, W represents the impulse response of FFE 332 and B represents the impulse response of DFE 336. The settings for FFE 332 and DFE 336, which represent the impulse responses, are preferably obtained and stored for subsequent communication to APCM 304 (as described below). DPCM 302 may utilize any number of alternate or additional equalization schemes to suitably compensate for the upstream transmission channel characteristics such as analog impairments. For example, DPCM 302 may include a noise predictor in addition to FFE 332 and DFE 336. Such equalizer and filter arrangements are known to those skilled in the art, and the present invention may employ such known arrangements. A number of such prior art elements are described in detail in ADAPTIVE FILTER THEORY (3rd ed. 1996) by Simon Haykin, the entire content of which is incorporated herein by reference.

The output of DFE 336 is subtracted from the output of FFE 332 and eventually fed to slicer 334. Slicer 334 is configured to perform a quantization decision for each equalized symbol. Slicer 334 generates an output codeword that best approximates the current input symbol. In an ideally optimized system, the input and the output to slicer 334 is substantially equal and, consequently, the decision error would be zero. However, due to the practical nature of the modem system, some amount of decision error will be present (e.g., error caused by additive noise or imperfections in the equalization process). The decision error is utilized to adaptively adjust FFE 332 and DFE 336 in an attempt to optimize the performance of DPCM 302. In a practical embodiment, once the decision error converges to an acceptable value, the equalizer structure is considered to be adequately trained.

De-mapper 338 receives the output of slicer 334 and applies a de-mapping algorithm to obtain digital data. The de-mapping algorithm is compatible with a data mapping algorithm employed by APCM 304. De-mapper 338 need not play an active role during the training mode because the original training sequence need not be designed to convey information to DPCM 302.

Figures 4, 6:
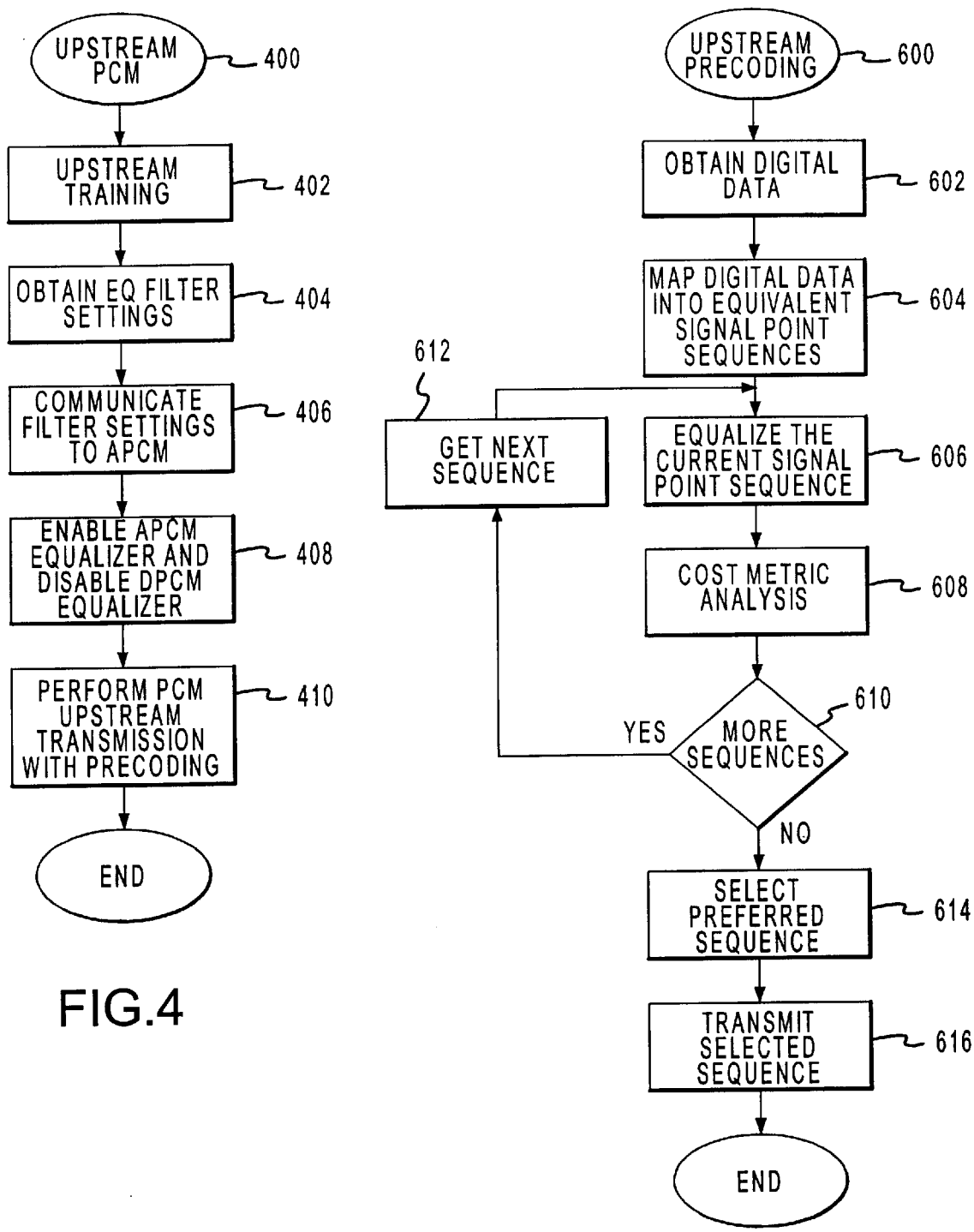
FIG. 4 is a flow diagram of an upstream,PCM process in accordance with the present invention.
FIG. 6 is a flow diagram of an upstream preceding process that may be performed by the modem system shown in FIG. 5.

As described above, the training mode described in connection with modem system 300 is performed to obtain the settings of AGC element 330, FFE 332,. and DFE 336. These settings are conveyed back to APCM 304 to enable APCM 304 to pre-equalize the transmit signal. FIG. 4 is a flow diagram of an upstream PCM process 400 that may be performed by a modem system configured in accordance with the present invention. In a practical system, process 400 (and other processes described herein) or portions of process 400 may be cooperatively performed by one modem device, both modem devices, host software, or any functional component of the modem system: In addition, process 400 may be realized in the context of a broader operating scheme that may follow any number of conventional telecommunication protocols.

Process 400 begins with a task 402, which causes the modem system to perform an upstream training routine to determine characteristics of an upstream channel from the APCM to the DPCM. The upstream training during task 402 may be performed by modem system 300. Following task 402, a task 404 may be performed to obtain filter settings for an equalizer structure resident at DPCM 302. As described above, these filter settings are associated with the characteristics of the upstream channel and define the impulse responses of FFE 332 and DFE 336. In a practical system, task 404 may cause DPCM 302 to save the filter tap coefficients of FFE 332 and DFE 336 after the training procedure is completed. Task 404 may also cause DPCM 302 to save the settings of AGC element 330.

A task 406 is preferably performed to enable DPCM 302 to communicate the filter settings to APCM 304. Task 406 may cause DPCM 302 to transmit a suitable information sequence that is recognizable by APCM 304. In response to the information sequence, APCM 304 may extract the data associated with the filter settings. Following task 406, a task 408 may be performed to activate or enable an equivalent equalizer structure in APCM 304. The equivalent equalizer structure preferably utilizes the same filter settings that were determined by DPCM 302. The equivalent equalizer structure is described in more detail in connection with FIG. 5 below. Task 408 may also disable the equalizer structure resident at DPCM 302. For example, in the embodiment illustrated in FIG. 3, FFE 332 and DFE 336 may be disabled or "removed" from DPCM 302.

Task 408 may be performed in a synchronized manner such that the respective equalizer structures are enabled and disabled at the appropriate time. Any number of synchronization or timing techniques may be utilized for this purpose. In the preferred embodiment, task 408 is performed to accommodate a transition from an initialization mode to a data mode. In effect, task 408 causes the equalization function to be moved from DPCM 302 to APCM 304.

In response to task 408, a task 410 may be prompted to cause the modem system to perform PCM upstream transmission with precoding in accordance with the present invention. Task 410 assumes that the signal points utilized for the upstream transmission are selected from a nonlinearly-spaced signal point constellation. The actual signal points may be mu-law points, A-law points, or levels derived from the mu-law or A-law constellations (e.g., levels "between" two adjacent mu-law or A-law signal points).

Figure 5:
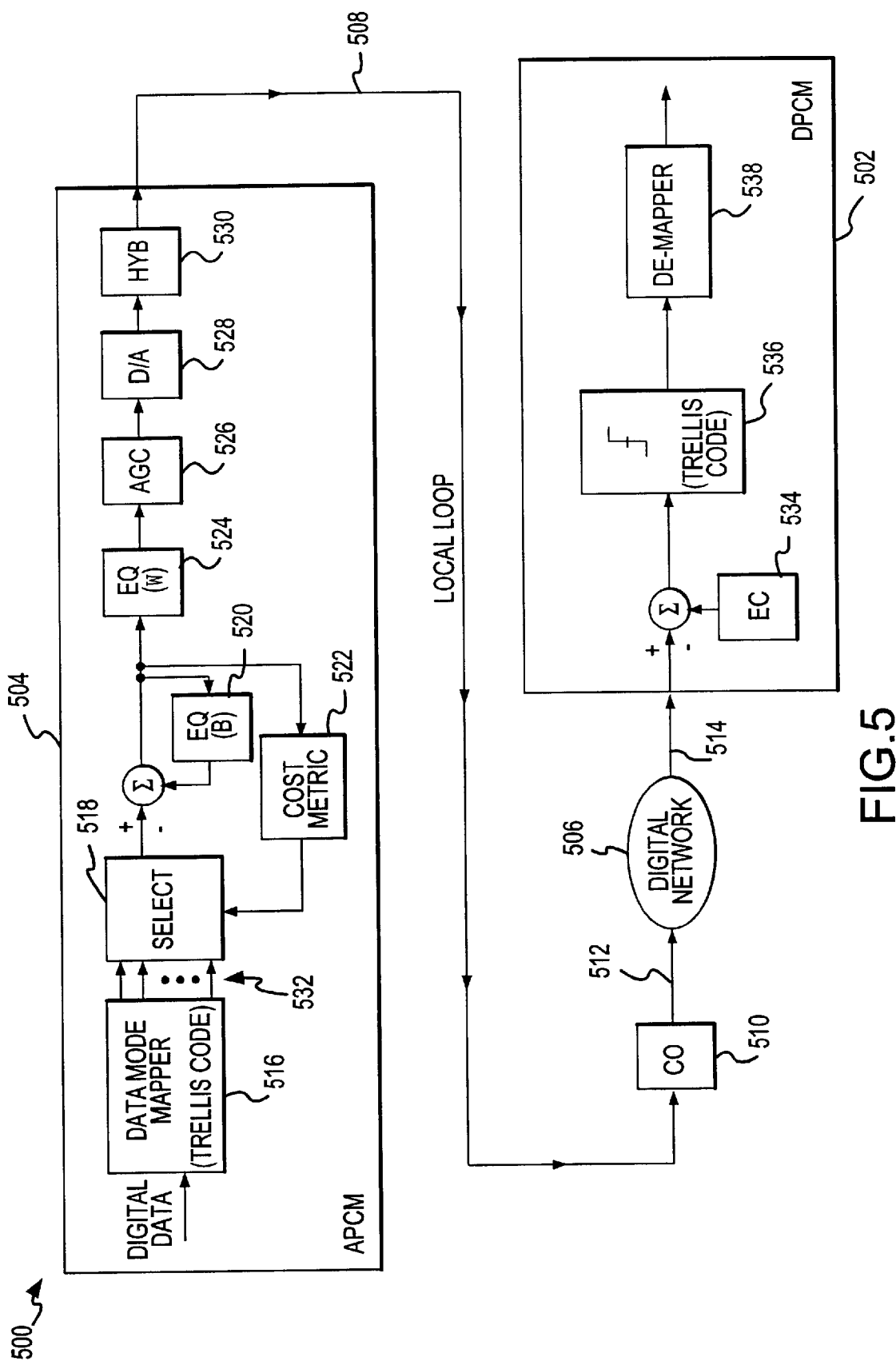
FIG. 5 is a block diagram representation of the modem system of FIG. 3 operating in a data mode.

Referring now to FIG. 5, the operation of a modem system 500 in an upstream transmission mode will be described. FIG. 5 is a block diagram representation of modem system 300 (see FIG. 3) operating in a data mode. In other words, task 410 (see FIG. 4) may be performed by modem system

500. Unless otherwise noted herein, elements described in connection with FIG. 3 are equivalent to the corresponding elements shown in FIG. 5. Accordingly, the description of such common elements will not be repeated in the context of FIG. 5.

Modem system 500 may include an APCM 504, an analog local loop 508, a central office 510, a digital connection 512 associated with central office 510, a digital communication network 506, a DPCM 502, and a digital connection 514 associated with DPCM 502. When operating in the data mode, modem system 500 transmits PCM codewords to convey data (or any codewords associated with signal points contained in a nonlinearly-spaced constellation) from APCM 504 to DPCM 502 via local loop 508, central office 510, and digital network 506.

APCM 504 generally includes a data mode mapper 516, a selection element 518, a feedback pre-equalizer 520, a cost metric analyzer 522, a feedforward pre-equalizer 524, an AGC element 526, a D/A converter 528, and a hybrid element 530. During the data mode, mapper 516 receives digital data (e.g., a stream of bits or a parallel bits) and maps the digital data into a plurality of signal point sequences 532. In accordance with a preferred embodiment, mapper 516 utilizes multiple modulus conversion (MMC) techniques to map the digital data into signal point sequences 532. Conventional V.90 modem systems employ MMC mapping in the context of downstream transmissions; APCM 504 may use a similar scheme. In an alternate embodiment, mapper 516 may include a trellis encoder. Signal point sequences 532 may contain mu-law points, A-law points, universal codewords, or any signal points selected from a nonlinearly-spaced constellation. In accordance with one aspect of the present invention, the different signal point sequences 532 are equivalent to one another. For purposes of this description, "equivalent" signal point sequences means that DPCM 502 will extract the same digital data for each of the signal point sequences 532. In accordance with one preferred embodiment, the equivalent signal point sequences need not exhibit equivalency at the signal point level as long as the overall sequences are equivalent. Modem system 500 may employ redundancy such that the same digital data can be represented by a plurality of signal point sequences.

Selection element 518 is configured to select one of the equivalent signal point sequences 532 in response to a control signal or an instruction from cost metric analyzer 522. Briefly, cost metric analyzer 522 obtains and analyzes a measurable quantity associated with each of the equivalent signal point sequences 532 and, based on a comparison of signal point sequences 532, causes selection element 518 to select a preferred one of the equivalent signal point sequences 532. In a preferred embodiment, cost metric analyzer 522 is configured to obtain a transmit power for each of the equalized sequences associated with the equivalent signal point sequences.

The equalizer structure associated with APCM 504 may include feedback pre-equalizer 520 and feedforward pre-equalizer 524. In response to task 408 (see FIG. 4), feedback pre-equalizer 520 is preferably initialized such that it has the same (or substantially the same) impulse response B associated with the training of DFE 336. Similarly, feedforward pre-equalizer 524 may be initialized such that it has the same (or substantially the same) impulse response W associated with the training of FFE 332. In this respect, APCM 504 utilizes the filter settings obtained during the training mode to pre-equalize the signals transmitted to DPCM 502. Similarly, APCM 504 initializes AGC element 526 in accordance with the trained setting for AGC element 330. In an ideal operating 13c environment, APCM 504 functions such that the A/D converter associated with central office 510 receives the appropriate levels (e.g., mu-law or A-law levels) for conversion into the digital codewords. Thus, the preceding and pre-equalization techniques are designed to compensate for changes to the transmitted levels caused by the analog channel.

D/A converter 528 and hybrid element 530 function in the same manner as D/A converter 318 and hybrid element 320. Accordingly, these components will not be described in detail in the context of modem system 500. APCM 504 transmits the selected signal point sequence (or a suitable signal or sequence of codewords associated with the selected signal point sequence) to central office 510. In a practical system, the total average power of signals transmitted over local loop 508 may be restricted such that it does not exceed local regulatory limits, e.g., −9 dBm in the United States. Although not shown in FIG. 5, central office 510 may include the components described above in connection with central office 310 (see FIG. 3). The mu-law or A-law codewords generated by central office 510 are eventually received in digital form by DPCM 502. In an ideal environment, the pre-equalization performed by APCM 504 accurately compensates for the characteristics of the upstream channel and the upstream data rate is optimized.

In the context of the data mode, DPCM 502 includes an echo canceler 534, a slicer 536, and a de-mapper element 538. The encoded transmit sequence is suitably processed by echo canceler 534, which functions in the same manner as echo canceler 328 (described above). Notably, because APCM 504 performs the AGC function, DPCM 502 need not employ an AGC element. In other words, AGC element 330, which was active during the training mode, is effectively removed from DPCM 502 during the data mode. In addition, the preceding performed by APCM 504 during the data mode obviates the need for the equivalent FFE and DFE structures in DPCM 502. Accordingly, these equalizer structures are not utilized by DPCM 502 during the data mode.

The echo canceled signal may be used as an input to slicer 536. If a trellis encoder is employed by APCM 504 (as in an alternate embodiment), then a trellis decoder may be used in place of slicer 536. As described above in connection with FIG. 3, slicer 536 is configured to perform a quantization decision for each input symbol. The output of slicer 536 may be associated with mu-law codewords, A-law codewords, universal codewords, or estimated levels. De-mapper 538 receives the output of slicer 536 and applies the same mapping algorithm employed by mapper 516 to extract digital data to be used by the host associated with DPCM 502. In an ideal operating environment, the original digital data is fully recovered by de-mapper 538.

Referring now to FIG. 6, an upstream preceding process 600 may be performed by modem system 500 during the data transmission mode. For illustrative purposes, the description of process 600 will refer to modem system 500 (of course, process 600 may be performed by any suitable system configuration). Process 600 may be associated with or performed during task 410 (see FIG. 4).

Process 600 begins with a task 602, during which digital data is obtained by APCM 504. The digital data may be generated by any suitable host software application, operating system, or the like. The digital data may be formatted as a serial stream or as a sequence of parallel words. A task 604 may be performed by mapper 516 such that the digital data is mapped into a plurality of equivalent signal point sequences, where each signal point in the equivalent sequences is selected from or associated with the slicer levels utilized in the central office codec or line card codec. As discussed above, in a practical embodiment the signal points are nonlinearly-spaced. The signal points may be mu-law points, A-law points, slicer levels between mu-law or A-law points, or a combination thereof. As described above, APCM 504 may employ redundancy to enable a plurality of different signal point sequences to represent the same digital data. The methodology employed by APCM 504 to generate the equivalent signal point sequences is described in more detail below. In a practical embodiment, task 604 may be performed in a sequential manner, i.e., mapper 516 may be suitably controlled to generate a first sequence for processing (as described below) and subsequent sequences after the first sequence is processed. It should be appreciated that any number of implementation schemes may be employed by the present invention to carry out the functions described herein.

A task 606 may be performed to equalize the "current" signal point sequence under analysis to obtain a corresponding pre-equalized sequence. In the embodiment illustrated in FIG. 5, the signal point sequence is processed by feedback pre-equalizer 520 and the corresponding pre-equalized sequence may be used as the input to feedforward pre-equalizer 524. In an alternate embodiment, the signal point sequence is processed by feedback pre-equalizer 520 and feedforward pre-equalizer 524 and the output of feedforward pre-equalizer 524 is considered to be the corresponding pre-equalized sequence. Indeed, the input or output of any suitable component in APCM 504 may serve as the "corresponding equalized sequence" for purposes of this description.

Following task 606, the equalized signal point sequence may be subjected to a cost metric analysis (task 608). Cost metric analyzer 522 (see FIG. 5) preferably obtains the equalized sequence as an input and processes the equalized sequence in accordance with any number of suitable techniques. During task 608, cost metric analyzer 522 may obtain a measurable quantity related to the equalized sequence for subsequent comparisons to equivalent sequences. For example, in a preferred embodiment, the cost metric analysis is associated with the transmit power of the equalized signal point sequence (which, in turn, is associated with the transmit power of the original signal point sequence generated by mapper 516). Cost metric analyzer 522 may utilize any number of techniques, e.g., an exact power calculation, an estimated power calculation, a filtered power calculation, a peak-limiting determination, a spectrum whitening criteria, or the like. Cost metric analyzer 522 may calculate and store the quantity for use during a task 614 (described below).

A query task 610 may be performed to determine whether there are other signal point sequences that need to be analyzed. If so, then a task 612 may be performed to get the next sequence from mapper 516. As mentioned above, mapper 516 may generate the signal point sequences in a serial manner or it may generate a plurality of sequences (which can be stored by APCM 504 until needed). Following task 612, process 600 is re-entered at task 606 and the next sequence is equalized and analyzed as described above. In this manner, process 600 generates a plurality of signal point sequences and performs a cost metric analysis for each of the sequences.

If query task 610 determines that all of the signal point sequences have been analyzed, then process 600 proceeds to a task 614. Task 614 causes APCM 504 to select a preferred signal point sequence from the plurality of equivalent signal point sequences based on the cost metric analysis. In a practical embodiment where the cost metric is based on a power measurement, the preferred signal point sequence has the lowest transmit power of the equivalent signal point sequences. Task 614 may be performed by selection element 518 in conjunction with cost metric analyzer 522, which may identify which signal point sequence is to be selected. In this respect, cost metric analyzer 522 and/or selection element 518 may be configured to compare the measured quantities, e.g., the transmit power values, associated with the various sequences. Thus, task 614 is responsive to the comparison of the measured quantities.

Once a preferred signal point sequence is chosen, a task 616 may be performed such that APCM 504 transmits a portion (e.g., the initial portion) of the preferred signal point sequence to DPCM 502. From the perspective of DPCM 502, the particular signal point sequence is associated with the same digital data. Thus, the cost metric analysis and sequence selection performed by APCM 504 is transparent to DPCM 502. Process 600 is preferably performed in a continuous manner during the data mode. In a practical embodiment, process 600 may utilize look-ahead techniques such that future sequences are being analyzed and selected while current sequences are being transmitted.

As described above, APCM 504 produces a plurality of signal point sequences in connection with a precoding technique. One of the signal point sequences is selected for transmission to DPCM 502. A practical embodiment may utilize different techniques to generate the equivalent signal point sequences. For example, the preceding technique employed by APCM 504 may utilize a frame-based scheme, a sample-based scheme, a look-ahead scheme, a signal point shaping scheme, or the like. In the context of this description, a frame-based scheme generates equivalent signal point sequences by altering the codewords or signal points in a given frame in accordance with a specific protocol. In contrast, a sample-based scheme generates equivalent signal point sequences by altering individual codewords or signal points independently in accordance with a specific methodology. Lastly, a signal point shaping scheme generates equivalent signal point sequences by altering the mapping scheme associated with the signal point constellation.

Figure 7:
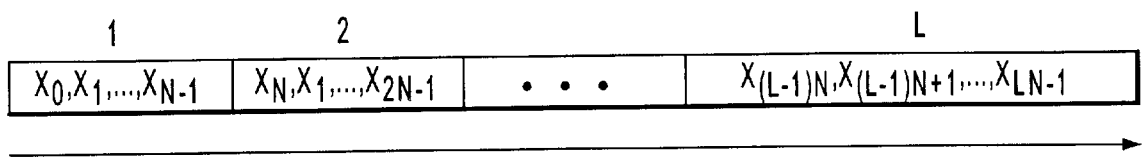
FIG. 7 is a schematic representation of a frame-based scheme that may be used in the context of the present invention.

FIG. 7 is a schematic representation of a frame-based look-ahead scheme that may be used in the context of the present invention. FIG. 7 depicts frame one to frame L, where each frame includes N signal points or codewords (the codewords are represented by the x values). In the context of FIG. 5, mapper 516 considers the next L frames during the preceding procedure. In one practical application, each frame includes one bit that is utilized to control whether or not the sign of the codewords in the given frame is flipped. For example, if the control bit for the first frame is "1", then the sign of each codeword in the first frame is flipped from positive to negative and vice versa. If the control bit is "0", then the signs remain unchanged. In this respect, the precoding technique may be considered to be a frame-based sign inversion scheme.

For L frames, there will be a total of $2^L$ possible sign variations (assuming each frame includes one control bit). Therefore, mapper 516 may be configured to generate up to $2^L$ different sequences during upstream preceding process 600. Mapper 516 may be configured to generate less than the maximum possible sequences, particularly if the sign of one (or more) codeword is fixed by default. In the illustrative embodiment described herein,. the sequence having the lowest associated transmit power dictates whether or not the signs in the first frame are flipped. In other words, if the first frame of the selected sequence includes flipped signs, then the codewords in the first frame are transmitted with flipped signs (and vice versa). After the L frames are analyzed and the signs for the first frame are determined, the frames are "shifted" and the procedure is repeated for the second frame, the third frame, and so on.

In one practical embodiment, modem system 500 utilizes frames having three codewords, and the last codeword in each frame is assigned a positive sign prior to precoding. Upon receipt of a frame, DPCM 502 analyzes the last codeword to determine whether the signs have been flipped. Thus, if DPCM 502 determines that the last codeword has a positive sign, then all of the signals are left unchanged. If DPCM 502 determines that the last codeword has a negative sign, then it assumes that all three signs were flipped as a result of the precoding technique. Accordingly, DPCM 502 may reverse the signs for that frame prior to processing the codewords.

Figure 8:
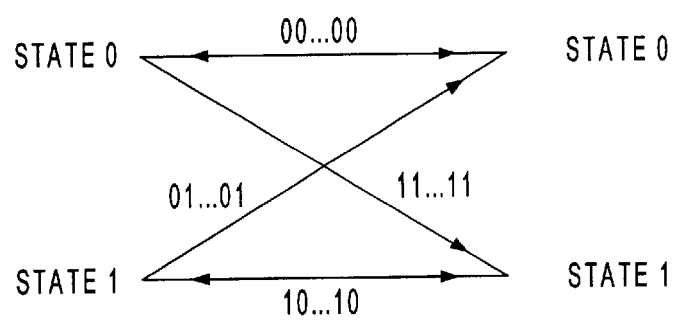
FIG. 8 is a state diagram associated with a sample-based scheme that may be used in the context of the present invention.

FIG. 8 is a state diagram associated with another frame-based scheme that uses a state machine. In contrast to the process described in connection with FIG. 7, the state diagram is associated with one embodiment of a sample-based sign inversion scheme. APCM 504 may utilize the L redundant bits (associated with L frames) to select a sign inversion pattern in accordance with a two-state state machine. The particular state machine shown in FIG. 8 is merely one example of a suitable embodiment that may be employed by mapper 516.

As shown, the frame-to-frame transition of the redundant bit dictates the sign inversion pattern for the codewords contained in the current frame. For this particular example state diagram, a "0 to 0" transition represents a sign inversion pattern of all zeros; in this example, all zeros indicates that all signs remain unchanged. A "1 to 1" transition represents a sign inversion pattern of 10 . . . 10, which indicates that every other sign is flipped beginning with the first codeword in the frame. A "0 to 1" transition represents a sign inversion pattern of all ones, which indicates that every sign in the frame is changed. Lastly, a "1 to 0" transition represents a sign inversion pattern of 01 . . . 01, which indicates that every other sign is flipped beginning with the second codeword in the frame.

Assuming that N=4, L=4, the initial state is 0, and the redundant bit pattern is 1011, the state diagram of FIG. 8 would result in a sign inversion pattern of 1111010111111010. In other words, the sign of codewords 0, 1, 2, 3, 5, 7, 8, 9, 10, 11, 12, and 14 are inverted. It should be appreciated that this technique can be generalized to employ a state machine having a larger number of states and different transition bit patterns. In a practical implementation, all possible redundant bit patterns may be utilized to generate a plurality of sign inversion patterns. As in the previous embodiment, the sign inversion pattern that yields the lowest transmit power may determine how the signs in the first frame are affected.

Figure 9:
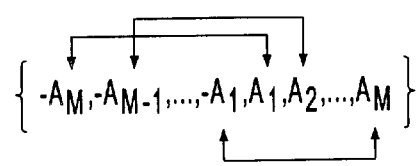
FIG. 9 is a schematic representation of a remapping scheme that may be used in the context of the present invention.

FIG. 9 is a schematic representation of a signal point remapping scheme that may be used in the context of the present invention. This remapping technique is one example of a sample-based shaping scheme that can be incorporated into a practical system. In lieu of the sign inversion techniques, the remapping scheme may be utilized to obtain the equivalent signal point sequences. In one embodiment, the remapping scheme is similar to the frame-based look-ahead scheme described above in connection with FIG. 7; depending upon the value of the redundant bit for the given frame, the remapping scheme may or may not be implemented. Thus, the different redundant bit patterns are used to generate a plurality of signal point sequences having certain frames affected by the remapping scheme.

The example signal point remapping scheme depicted in FIG. 9 begins with the signal point constellation $\{-A_M, -A_{M-1}, \ldots, A_1 A_1, A_2, \ldots, A_M\}$, where $A_i > 0$ for $1 \leq i \leq M$. The example signal point remapping function shown in FIG. 9 can be expressed as: $f(A_i) = -A_{M-i+1}$; $f(-A_i) = A_{M-i+1}$. FIG. 9 is a visual representation of this remapping function. Thus, assuming that the codeword $-A_1$ is transmitted in a "normal" frame, the codeword $A_M$ would be transmitted in a corresponding frame affected by the remapping technique. Those skilled in the art will recognize that the use of such a remapping scheme may introduce some shaping gain to the signal point sequence. In addition, the present invention is not limited to the remapping arrangement shown in FIG. 9; any suitable remapping scheme may be employed.

An alternate precoding scheme may combine the coding technique described in connection with FIG. 8 with the remapping technique described in connection with FIG. 9. Thus, the coding technique can be utilized to determine different remapping patterns associated with the codewords included in the frames. In other words, the resultant bit patterns determined by the state diagram are used in conjunction with the application of the remapping algorithm rather than a sign inversion.

The above framing schemes may be further generalized to employ binary codes where information bits select the coset of a binary code and where a suitable precoding algorithm is applied to select between elements of the coset. Different signal sequences representing the same coset are thus equivalent sequences. In such an embodiment, the bits in the code would correspond to the signs of the samples. The cosets are designed such that the minimum distance between members of a coset is maximized. Correspondingly, the precoder is presented with a set of signal sequences where the difference in precoder filter output from one to another is maximized, thus presenting selection element 518 (see FIG. 5) with a wide variety of choices, ultimately making an optimal choice more likely. In accordance with this scheme, the receiver need only be concerned with the coset received and may ignore which coset member was transmitted. Such a scheme, and an alternate application therefore, is further described in U.S. patent application Ser. No. 08/746,731, the content of which is hereby incorporated by reference.

Generally, the present invention may employ any number of frame-based or sample based techniques, state machines, look-ahead techniques, and/or shaping techniques to generate the equivalent signal point sequences. The different possible approaches enable the techniques described herein to be implemented in a flexible manner.

As described above, these and other precoding methods may be utilized by APCM 504 during upstream precoding process 600. Such precoding methods can be used to generate a plurality of equivalent signal point or codeword sequences. One sequence is selected in accordance with a particular cost metric, e.g., transmit power, and transmitted to DPCM 502. In this manner, modem system 500 is capable of utilizing PCM transmission techniques in the upstream direction while complying with current transmit power restrictions associated with the PSTN.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A method for transmitting data in a modem system having a first modem coupled to a digital communication network via an analog connection and a second modem coupled to said digital communication network via a digital connection, said method comprising the steps of:

mapping digital data into a plurality of equivalent signal point sequences, each signal point in said equivalent signal point sequences being selected from a nonlinearly-spaced signal point constellation;

pre-equalizing each of said equivalent signal point sequences to obtain a corresponding plurality of pre-equalized signal point sequences;

performing a cost metric analysis for each of said pre-equalized signal point sequences;

selecting a preferred signal point sequence from said equivalent signal point sequences based on said cost metric analysis; and transmitting at least a portion of said preferred signal point sequence from said first modem to said second modem.

2. A method according to claim 1, wherein said transmitting step transmits said at least a portion of said preferred signal point sequence over said analog connection, said digital communication network, and said digital connection.

3. A method according to claim 1, wherein:

said cost metric analysis is associated with the transmit power of said equivalent signal point sequences; and said preferred signal point sequence has the lowest transmit power of said equivalent signal point sequences.

4. A method according to claim 1, wherein said mapping step is associated with a precoding technique.

5. A method according to claim 4, wherein said precoding technique comprises a frame-based scheme.

6. A method according to claim 4, wherein said preceding technique comprises a sample-based scheme.

7. A method according to claim 4, wherein said preceding technique comprises a signal point shaping scheme.

8. A method according to claim 4, wherein said preceding technique comprises a look-ahead scheme.

9. A method according to claim 1, wherein said modem system is a pulse code modulation modem system compliant with the ITU-T Recommendation V.90.

10. A method of claim 1 further comprising the step of:

receiving equalizer settings from said second modem for use in said pre-equalizing step.

11. A method for transmitting data in a modem system having a first modem coupled to a digital communication network via an analog connection and a second modem coupled to said digital communication network via a digital connection, said method comprising the steps of:

(a) mapping digital data into a first sequence of signal points, each signal point in said first sequence being selected from a nonlinearly-spaced signal point constellation;

(b) pre-equalizing said first sequence to obtain a first pre-equalized sequence;

(c) obtaining a first measurable quantity related to said first pre-equalized sequence;

(d) mapping said digital data into a second sequence of signal points, each signal point in said second sequence being selected from said nonlinearly-spaced signal point constellation;

(e) pre-equalizing said second sequence to obtain a second pre-equalized sequence;

(f) obtaining a second measurable quantity related to said second pre-equalized sequence;

(g) comparing said first measurable quantity to said second measurable quantity; and (h) selecting one of said first and second sequences for transmission based on said comparing step.

12. A method according to claim 11, further comprising the step of transmitting at least a portion of said one of said first and second sequences from said first modem to said second modem.

13. A method according to claim 11, wherein said comparing step is associated with a cost metric for said modem system.

14. A method according to claim 13, wherein:

said cost metric is associated with the transmit power of said first and second equalized sequences; and said selecting step selects said one of said first and second sequences corresponding to the equalized sequence having the lowest transmit power.

15. A method according to claim 11, wherein said first and second sequences are equivalent representations of said digital data.

16. A method according to claim 11, wherein said mapping steps (a) and (d) are each associated with a precoding technique.

17. A method according to claim 16, wherein said precoding technique utilizes a frame-based sign inversion scheme.

18. A method according to claim 16, wherein said precoding technique utilizes a sample-based sign inversion scheme.

19. A method of claim 11 further comprising the step of:

(i) receiving equalizer settings from said second modem for use in said pre-equalizing step.

20. A method for transmitting data in a modem system having a first modem coupled to a digital communication network via an analog connection and a second modem coupled to said digital communication network via a digital connection, said method comprising the steps of:

performing a training routine to determine characteristics of an upstream channel from said first modem to said second modem;

obtaining filter settings for an equalizer structure resident at said second modem, said filter settings being associates with said characteristics of said upstream channel;

communicating said filter settings to said first modem;

activating an equivalent equalizer structure utilizing said filter settings in said first modem, said activating step being performed after said communicating step;

mapping digital data into a plurality of equivalent signal point sequences; and pre-equalizing said plurality of equivalent signal point sequences to obtain a respective plurality of pre-equalized signal point sequences, said pre-equalizing step being performed by said equivalent equalizer structure.

21. A method according to claim 20, further comprising the step of disabling said equalizer structure, said disabling step being performed after said communicating step.

22. A modem device for transmitting data to a remote device over an upstream channel, said modem device comprising:

a data mode mapper configured to map digital data into a plurality of equivalent signal point sequences, where each signal point in said plurality of equivalent signal point sequences is selected from a nonlinearly-spaced signal point constellation;

an equalizer structure configured to pre-equalize each of said equivalent signal point sequences to obtain a corresponding plurality of pre-equalized signal point sequences;

a cost metric analyzer configured to obtain a measurable quantity for each of said plurality of pre-equalized signal point sequences; and a selection element configured to select a preferred signal point sequence based on a comparison of said measurable quantity for a number of said pre-equalized signal point sequences; and a transmitter configured to transmit at least a portion of said preferred signal point sequence to said remote device.

23. A method according to claim 20, further comprising the steps of:

comparing said plurality of pre-equalized signal point sequences with respect to a cost metric for said modem system; and selecting a preferred signal point sequence from said plurality of equivalent signal point sequences, in response to said comparing step.

24. A modem device according to claim 22, wherein said equalizer structure has filter settings associated with characteristics of said upstream channel.

25. A modem device according to claim 24, wherein said equalizer structure has filter settings associated with characteristics of said upstream channel.

26. A modem device according to claim 25, wherein said equalizer structure comprises a feedback pre-equalizer.

27. A modem device according to claim 25, wherein said cost metric analyzer is configured to obtain a measurable characteristic for each of said plurality of pre-equalized sequences.

28. A modem device according to claim 27, wherein said measurable characteristic comprises a transmit power.

29. A modem device according to claim 25, wherein:

said filter settings for said equalizer structure are determined by said remote device; and said modem device further comprises a receiver configured to receive data indicative of said filter settings from said remote device.

30. A method of communicating data using a modem system having a first modem and a second modem in communication via a communication line, said method comprising:

initiating a training sequence by said first modem to enable a determination of characteristics of an upstream channel from said first modem to said second modem;

receiving equalizer settings for an equalizer structure from said second modem, said equalizer settings being associated with said characteristics of said upstream channel, activating said equalizer structure in said first modem based on said equalizer settings;

mapping said data into a plurality of signal point sequences; and pre-equalizing said plurality of signal point sequences, using said equalizer structure, to obtain a respective plurality of pre-equalized signal point sequences.

31. A method according to claim 30 further comprising:

comparing said plurality of pre-equalized signal point sequences with respect to a cost metric; and selecting a preferred signal point sequence from said plurality of pre-equalized signal point sequences, in response to said comparing.

32. A method according to claim 30, wherein said equalizer settings include FFE settings and DFE settings.

33. A method of communicating data using a modem system having a first modem and a second modem in communication via a communication line, said method comprising:

determining characteristics of an upstream channel from said first modem to said second modem, by said second modem, based on a training sequence initiated by said first modem;

transmitting equalizer settings by said second modem to said first modem, said equalizer settings being associated with said characteristics of said upstream channel; and receiving a plurality of signal point sequences by said second modem from said first modem;

wherein said plurality of signal point sequences being pre-equalized based on said equalizer settings.

34. A method according to claim 33, wherein said second modem includes an equalizer structure, and wherein said method further comprises deactivating said equalizer structure prior to said receiving.

35. A method according to claim 33, wherein said equalizer settings include FFE settings and DFE settings.

36. A modem capable for communicating data with a remote device via a communication line, said modem comprising:

a training element capable of initiating a training sequence to enable a determination of characteristics of an upstream channel by said second modem;

a receiver configure to receive equalizer settings from said second modem, said equalizer settings being associated with said characteristics of said upstream channel, a mapper configured to map said data into a plurality of signal point sequences; and an equalizer structure capable of being activated based on said equalizer settings for pre-equalizing said plurality of signal point sequences to obtain a respective plurality of pre-equalized signal point sequences.

37. A modem according to claim 36 further comprising a selection element capable of comparing said plurality of pre-equalized signal point sequences with respect to a cost metric, and selecting a preferred signal point sequence from said plurality of pre-equalized signal point sequences, in response to said comparing.

38. A modem according to claim 36, wherein said equalizer settings include FFE settings and DFE settings.

* * * * *